June 1, 1926.
L. W. MULFORD
1,587,487
SKYLIGHT AND FLOORLIGHT CONSTRUCTION
Filed May 15, 1924
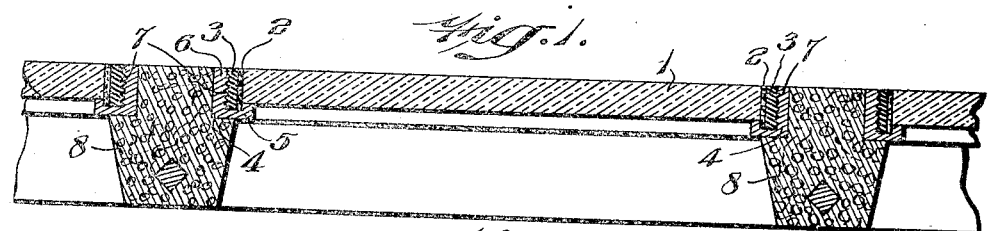
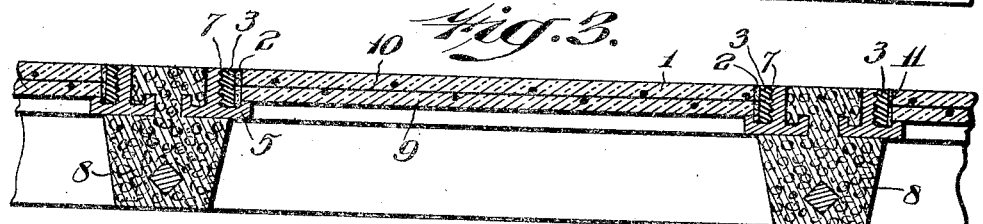
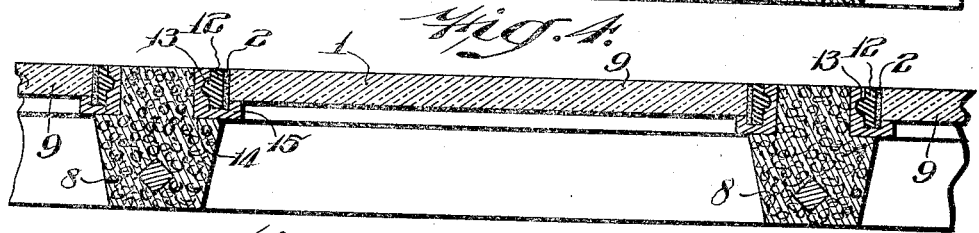
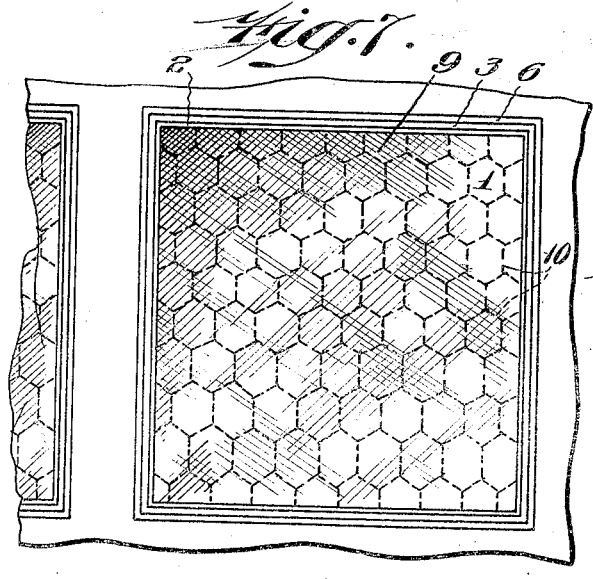
INVENTOR:
Logan Willard Mulford
BY
ATTORNEYS.

Patented June 1, 1926.

1,587,487

UNITED STATES PATENT OFFICE.

LOGAN WILLARD MULFORD, OF LONG ISLAND CITY, NEW YORK.

SKYLIGHT AND FLOORLIGHT CONSTRUCTION.

Application filed May 15, 1924. Serial No. 713,607.

In the building of skylight and floorlight constructions, a much stronger and more durable construction is provided if the supporting framework is made of reinforced concrete and provided with lens receiving openings.

A further advantage is obtained when a cast iron or sheet metal lens holder is employed to receive the lenses.

It has heretofore been customary and been deemed necessary to employ in conjunction with such a holder, a lens of molded glass, which is expensive to manufacture and which is liable to break in service and thus require replacement. If a lens holder is not employed, and the glass set directly in the concrete, the glass is liable to become fractured while it is set directly in the concrete, as the glass has a different coefficient of expansion from that of the rest of the construction. The replacement of these lenses, while they are set directly in the concrete is expensive as it requires a skilled workman to remove the broken lens and replace a new one.

In accordance with my present invention, I dispense with the necessity of using a molded glass and am enabled to employ a lens made from a sheet of rolled annealed glass or rolled annealed wire glass of the type, wherein during the rolling of the sheet glass, wire mesh is embedded between the top and bottom surfaces of the sheet, thereby greatly increasing the strength of the sheet and preventing the flying of the pieces in case the glass becomes fractured or broken.

By such construction, I can produce a floorlight and skylight construction, wherein the strength of the resultant construction is materially increased and at less cost, since the lens of such construction is more economical than the lens of molded glass, since the lenses can be formed from broken sheets of wire glass, which is a waste product, as the broken sheets are too small to be utilized for other purposes.

My invention further consists in roughening or serrating the inner face of the vertical wall of the lens holder, whereby the sealing compound more effectively adheres thereto.

My invention further consists in causing the terminals of the wire mesh which is embedded in the rolled annealed glass lens to project a short distance from the edges of the lens whereby the lens is more effectively secured in position.

It further consists in coating the edges of the rolled annealed glass lens, either plain or wired, with a suitable material, which will cause the elastic or sealing compound contacting therewith properly to adhere thereto, to make a water proof joint and also to prevent the lens from becoming loosened.

It further consists of the novel combination of a rolled annealed glass lens having its edges coated with a suitable material of the character stated, in conjunction with a sealing compound and a lens holder having its vertical wall serrated or roughened so as to inter-lock with said sealing compound.

With the foregoing and other objects in view, which will hereinafter clearly appear, my invention comprehends a novel construction of a skylight and floorlight construction of the character stated, which can be economically manufactured and which will be stronger and more durable than constructions of this general type as heretofore manufactured.

Other novel features of construction and advantage will hereinafter appear in the detailed description and the appended claims.

For the purpose of illustrating my invention, I have shown in the accompanying drawing embodiments thereof which are at present preferred by me, since they will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figures 1, 2, 3, 4 and 5 represent vertical sectional views of a skylight or floorlight construction embodying my invention.

Figure 6 represents a perspective view of a portion or corner of the wired glass lens which I employ.

Figure 7 represents a plan view of my novel skylight or floorlight.

Similar numerals of reference indicate corresponding parts.

Referring to the drawings:—

The framework of my novel construction is formed of reinforced concrete with the reinforcements extending through the concrete at right angles to each other and the depth of the reinforced concrete and the character of the reinforcements and their arrangement may obviously vary in accordance with the requirements met with in practice.

The reinforced concrete construction is thus in the form of reinforced concrete girders connected together to form lens receiving openings and the rolled annealed glass lenses are supported by lens holders, which are ordinarily in the form of a cast iron or metallic frame, which may have any desired contour as may the rolled annealed glass lenses employed.

In carrying out my invention, I employ for the lenses either annealed, rolled glass or annealed rolled wired glass which are cut to the desired contour at any desired stage in the manufacture of the sheet, and are supported upon the inwardly projecting ledges or flanges of the lens holder, the edges of the lens being provided with means which will cause the elastic or sealing compound to properly adhere thereto, thereby making a water tight joint, and this novel construction will also prevent the glass lens from becoming loose.

In addition, I preferably roughen or serrate the inner face of the vertical wall of the lens holder, so that the sealing compound will in practice adhere directly thereto, and be inter-locked therewith.

In addition, in practice, the terminals of the wires forming the wire mesh which is embedded in the rolled wired glass lens are left to project a short distance, so that they form a connecting means, which will be embedded for a short distance in the sealing compound or the coating compound on the edges of the lens. I have shown several embodiments of my present invention, and in Figure 1, 1 designates the rolled, annealed glass lens having applied to the edges thereof a coating or compound indicated at 2, which will cause the elastic or sealing compound indicated at 3 to properly adhere so as to make a water tight joint and also prevent the glass from becoming loose after installation. The relatively thin metallic lens holder is indicated at 4 and is provided with a horizontal or laterally projecting ledge or flange 5 upon which the lens is supported and a vertical wall 6, which latter is preferably serrated or roughened as at 7, said lens holder being seated in the reinforced concrete 8. In Figure 2, I have shown the lens holder 4 provided with the horizontal and vertical members 5 and 6 of the same character as already described, as supporting the annealed rolled wired glass lens 9, the wire mesh being indicated at 10 and the ends 11 of the wires being shown as projecting slightly as best seen in Figure 6. In Figure 2, I have shown the inner surface of the vertical wall 6 as smooth, while in Figure 3, I have shown said wall as roughened as indicated at 7, the other parts in Figure 3 being the same, as seen in Figure 2.

In Figure 4, I have shown a rolled annealed glass lens 1 of the same character as seen in Figure 1, the edge of said lens being coated with material 2 of the character already described, which is surrounded by the sealing compound 12, which seats into the annular groove 13 seen in the lens holder 14, which is provided with the lateral portion or ledge 15, upon which the lens is supported. In Figure 5, I have shown a lens holder 14 of the same character, as seen in Figure 4, upon which the rolled, annealed wired glass lens 9 is supported, the edges of the latter being enclosed by the sealing compound 12 of the same character as seen in Figure 4.

I am aware that it has heretofore been proposed to employ in conjunction with a lens holder a lens of molded glass, and that it has heretofore been proposed to place a large pane of wired glass in a large opening in a mass of concrete, the edges of said glass being secured directly in the concrete. This structure however cannot in practice be walked on, and is different structurally and functionally from my present invention.

I am, however, the first in the art to employ a lens formed from a rolled annealed sheet of glass in a metallic lens holder of the character described, and I am the first in the art to employ a lens composed of annealed, rolled sheet glass, in conjunction with the coating material interposed between the edge of the lens and the sealing compound, for the purposes stated.

I am also the first in the art to employ a lens made from rolled annealed wired glass having the wire terminals projecting from the edges of the lens, and said edges coated with a material of the character described adhering to the contacting sealing compound, which latter engages the serrated inner face of the vertical wall of the lens holder, whereby the lens is immovably secured in position and a water tight and durable construction is produced.

By my present construction and by the utilization of rolled annealed wired glass lenses having the characteristics described, a much stronger and more durable construction than heretofore is produced, and if a lens becomes shattered or broken, it can be removed from its lens holder by unskilled labor and readily replaced with a new one, so that the efficiency and durability of the construction can at all times be maintained at a minimum of cost. The rolled annealed lenses can be removed without injuring the reinforced concrete framework, since said lenses are carried by their respective metallic lens holders, which are not liable to injury when a broken glass is being removed.

The wired glass lenses can be made from waste rolled annealed sheets for which at the present time there is no use, and the rolled sheet glass itself is much cheaper than pressed or molded glass and in addition the rolled sheet glass being of a more uniform thickness enables a more uniform annealing than can be obtained in pressed or molded glass, which is usually of uneven thickness and contour.

It will be obvious that the wire terminals or projections 11 best seen in Figure 6, affords additional anchoring or locking means to effect the securing of the lens in place, and said terminals preferably extend into the sealing compound 3, when the installation is completed.

It will now be apparent that I have devised a novel and useful skylight and floorlight construction which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and useful and desire to secure by Letters Patent, is:—

1. In a device of the character stated, a reinforced concrete frame work, having lens receiving openings therein, metallic lens holders embedded in the concrete, in the upper portions of said openings, and having their upper edges, substantially on a line with the top of said concrete frame work, an inwardly extending flange on said lens holders, relatively thin lenses formed of rolled, annealed wired glass positioned within said lens holders, and supported on said inwardly extending flanges, the terminals of the wires in said lenses projecting from the edges thereof, and a sealing compound interposed between said coating and the contiguous walls of said lens holders.

2. In a device of the character stated, a reinforced concrete frame work, having lens receiving openings therein, metallic lens holders embedded in the concrete, in the upper portions of said openings, and having their upper edges, substantially on a line with the top of said concrete frame work, an inwardly extending flange on said lens holders, relatively thin lenses, formed of wired glass positioned within said lens holders, and supported on said inwardly extending flanges, the terminals of the wires in said lenses projecting from the edges thereof, and a sealing compound interposed between said lenses and the contiguous walls of said lens holders.

3. A lens for side walk and floor light construction, composed of rolled, annealed wired glass, the terminals of the wire mesh in said glass projecting from the edges of the lens.

4. In a device of the character stated, a reinforced concrete frame work having lens receiving openings therein, metallic lens holders having vertical and horizontal walls embedded in the upper portions of said openings and having their upper edges substantially aligning with the top of said concrete, roughened surfaces on the inner vertical walls of said lens holders, lenses composed of relatively thin rolled, annealed glass having integral edge anchoring elements, supported upon said lens holders and a sealing compound intermediate the sides of said lenses and the vertical walls of said lens holders, and having its outer portions interlocked with said roughened vertical surfaces.

LOGAN WILLARD MULFORD.